(12) United States Patent
Choi et al.

(10) Patent No.: US 9,953,648 B2
(45) Date of Patent: Apr. 24, 2018

(54) ELECTRONIC DEVICE AND METHOD FOR CONTROLLING THE SAME

(71) Applicant: SAMSUNG ELECTRONICS CO., LTD., Suwon-si (KR)

(72) Inventors: Hyung-tak Choi, Suwon-si (KR); In-chul Hwang, Suwon-si (KR); Deok-ho Kim, Seoul (KR); Jung-sup Lee, Suwon-si (KR); Hee-sik Jeon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/130,399

(22) Filed: Apr. 15, 2016

(65) Prior Publication Data
US 2016/0336024 A1 Nov. 17, 2016

Related U.S. Application Data

(60) Provisional application No. 62/159,467, filed on May 11, 2015.

(30) Foreign Application Priority Data

Sep. 10, 2015 (KR) ........................ 10-2015-0128511

(51) Int. Cl.
*G10L 15/00* (2013.01)
*G10L 15/22* (2006.01)

(52) U.S. Cl.
CPC ........ *G10L 15/22* (2013.01); *G10L 2015/228* (2013.01)

(58) Field of Classification Search
USPC .......................... 704/239, 246, 247, 251, 252
See application file for complete search history.

(56) References Cited

U.S. PATENT DOCUMENTS

| 6,009,420 A | 12/1999 | Fagg, III et al. |
| 6,483,920 B2 | 11/2002 | Pinkas |

(Continued)

FOREIGN PATENT DOCUMENTS

| JP | 2005-086768 A | 3/2005 |
| JP | 2013-088535 A | 5/2013 |

(Continued)

OTHER PUBLICATIONS

Hwang, et al.; "Dialogue Management Method for IoT Home Assistant Service", Samsung, Best Paper Award 2015, 4 pages total.

*Primary Examiner* — Leonard Saint Cyr
(74) *Attorney, Agent, or Firm* — Sughrue Mion, PLLC

(57) ABSTRACT

An electronic device and a method for controlling the same are provided. The electronic device includes a storage configured to store domain information that is categorized for dialog subjects, a speaker configured to output a system response based on a user utterance sound, and a processor configured to detect a domain, among the domain information, based on the user utterance sound, determine one among the detected domain and a previous domain as a domain to be used to process the user utterance sound, based on a confidence between the user utterance sound and the detected domain, and process the user utterance sound to generate the system response, based on the determined domain.

18 Claims, 12 Drawing Sheets

(56) References Cited

U.S. PATENT DOCUMENTS

| | | |
|---|---|---|
| 7,386,531 B2 | 6/2008 | Kiessig et al. |
| 8,140,335 B2 | 3/2012 | Kennewick et al. |
| 8,301,450 B2 * | 10/2012 | Lee .................... G10L 15/1822 |
| | | 704/257 |
| 8,370,147 B2 | 2/2013 | Kennewick et al. |
| 8,560,325 B2 | 10/2013 | Kanevsky et al. |
| 8,719,026 B2 | 5/2014 | Kennewick et al. |
| 8,892,446 B2 | 11/2014 | Cheyer et al. |
| 2002/0133392 A1 | 9/2002 | Angel et al. |
| 2003/0220917 A1 | 11/2003 | Copperman et al. |
| 2005/0193055 A1 | 9/2005 | Angel et al. |
| 2005/0240756 A1 | 10/2005 | Mayer |
| 2007/0050191 A1 * | 3/2007 | Weider .............. G06F 17/30864 |
| | | 704/275 |
| 2007/0128899 A1 | 6/2007 | Mayer |
| 2008/0077954 A1 | 3/2008 | Cohen et al. |
| 2008/0177994 A1 | 7/2008 | Mayer |
| 2008/0215450 A1 | 9/2008 | Gates et al. |
| 2009/0217035 A1 | 8/2009 | Abdul Hameed Khan |
| 2011/0144999 A1 * | 6/2011 | Jang .................... G06K 9/00892 |
| | | 704/270.1 |
| 2012/0016678 A1 | 1/2012 | Gruber et al. |
| 2014/0108019 A1 | 4/2014 | Ehsani et al. |
| 2014/0214410 A1 * | 7/2014 | Jang .................... G06K 9/00892 |
| | | 704/201 |
| 2014/0214425 A1 * | 7/2014 | Bak ........................ G10L 15/08 |
| | | 704/249 |
| 2014/0223561 A1 | 8/2014 | Mitola, III |
| 2015/0019217 A1 * | 1/2015 | Di Cristo .............. G06F 17/279 |
| | | 704/235 |
| 2015/0179168 A1 * | 6/2015 | Hakkani-Tur .......... G10L 15/22 |
| | | 704/257 |
| 2016/0203523 A1 * | 7/2016 | Spasojevic ......... G06Q 30/0269 |
| | | 705/14.66 |

FOREIGN PATENT DOCUMENTS

| | | |
|---|---|---|
| KR | 10-1212795 B1 | 12/2012 |
| KR | 10-2014-0037519 A | 3/2014 |

* cited by examiner

ELECTRONIC DEVICE AND METHOD FOR CONTROLLING THE SAME

CROSS-REFERENCE TO RELATED APPLICATIONS

This application claims priority from Korean Patent Application No. 10-2015-0128511 filed on Sep. 10, 2015 in the Korean Intellectual Property Office, and U.S. Provisional Application No. 62/159,467 filed on May 11, 2015 in the United States Patent and Trademark Office, the disclosures of which are incorporated herein by reference in their entireties.

BACKGROUND

Field

Apparatuses and methods consistent with exemplary embodiments relate to an electronic device and a method for controlling the same, and more particularly, to an electronic device that can create a system response corresponding to a user utterance sound, and a method for controlling the same.

Description of the Related Art

With the development of electronic technology, various types of electronic devices have been developed and spread. Various kinds of display devices, such as televisions (TVs), portable phones, personal computers (PCs), notebook PCs, and personal digital assistants (PDAs), have been widely used even in homes.

As utilization of display devices is increased, user needs for more various functions have also been increased. Accordingly, manufacturers have made greater efforts to cope with such user needs, and products having new functions have appeared in succession.

In a home, not only display devices but also various kinds of electronic appliances, such as a refrigerator, an air conditioner, and a lamp, have been used, and a home network system for connecting and controlling such various kinds of electronic appliances through a network has currently been commercialized.

On the other hand, a user may achieve his/her desired purpose through a direct operation of the home network system, and in the case in which the home network system supports a voice recognition function, the user may also achieve his/her desired purpose through speaking of a voice command with respect to the home network system.

However, the system, which currently recognizes a user utterance sound and creates a response that corresponds to the recognized user utterance sound, is used to control only functions provided by one terminal device, and is unable to create a response through combination and comparison of functions of several terminal devices. Further, if a user utterance sound beyond a dialogue that is programmed in the system is recognized, the system is unable to process the recognized user utterance sound.

Further, if a user proceeds to a dialogue on another domain in a state in which the user and the system have a dialogue with each other on a domain, the system may not normally process such a dialogue.

Accordingly, there has been an increasing demand to recognize various user utterance sounds and to create corresponding responses on the basis of functions of several terminal devices.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide an electronic device and a method for controlling the same. The electronic device can create a system response through determination of a domain to process a user utterance sound.

According to an aspect of an exemplary embodiment, there is provided an electronic device including a storage configured to store domain information that is categorized for dialogue subjects, a speaker configured to output a system response based on a user utterance sound, and a processor configured to detect a domain, among the domain information, based on the user utterance sound, determine one among the detected domain and a previous domain as a domain to be used to process the user utterance sound, based on a confidence between the user utterance sound and the detected domain, and process the user utterance sound to generate the system response, based on the determined domain.

The storage may be further configured to categorize the dialogue subjects corresponding to respective domains for contexts, and store the categorized dialogue subjects, and the processor may be further configured to select a context, from the contexts, based on the user utterance sound, in response to the processor determining the previous domain as the determined domain, determine one among the selected context and a previous context as a context to be used to process the user utterance sound, based on a confidence between the user utterance sound and the selected context, and process the user utterance sound to generate the system response, based on the determined context.

The processor may be further configured to store information of the previous context in the storage in response to the processor determining the selected context as the determined context, and process a new utterance sound based on the stored information of the previous context in response to the processor processing the user utterance sound based on the selected context.

The processor may be further configured to store information of the previous domain in the storage in response to the processor determining the detected domain as the determined domain, and process a new utterance sound based on the stored information of the previous domain in response to the processor processing the user utterance sound based on the determined domain.

The processor may be further configured to determine the confidence between the user utterance sound and the detected domain based on whether an utterance element of the user utterance sound coincides with an utterance element of the detected domain.

The electronic device may further include a communicator configured to perform communication with an external device, and the processor may be further configured to, in response to the processor processing the user utterance sound to generate the system response based on a context using a control of a function of the external device in the determined domain, generate a system response for controlling the function of the external device based on information of the function of the external device.

The storage may be further configured to store the information of the function of the external device, the communicator may be further configured to receive new information of the function of the external device that is added in a network, and the processor may be further configured to update the stored information based on the received new information.

The processor may be further configured to determine one among the detected domain and the previous domain as the domain to be used to process the user utterance sound, based on utterance history information, and the utterance history information may include at least one among a previously received user utterance sound, information of a domain that was used to process the previously received user utterance sound, and a system response that was generated based on the previously received user utterance sound.

The domain information may include at least one among control information for performing tasks corresponding to the dialogue subjects and dialogue patterns for the dialogue subjects.

The electronic device may further include a microphone configured to receive the user utterance sound.

According to an aspect of another exemplary embodiment, there is provided a method for controlling an electronic device including a storage storing domain information that is categorized for dialogue subjects, the method including detecting a domain, among the domain information, based on a user utterance sound, determining one among the detected domain and a previous domain as a domain to be used to process the user utterance sound, based on a confidence between the user utterance sound and the detected domain, and processing the user utterance sound to generate a system response, based on the determined domain.

The method may further include categorizing the dialogue subjects corresponding to respective domains for contexts, selecting a context, from the contexts, based on the user utterance sound, in response to the determining the previous domain as the determined domain, determining one among the selected context and a previous context as a context to be used to process the user utterance sound, based on a confidence between the user utterance sound and the selected context, and processing the user utterance sound to generate the system response, based on the determined context.

The method may further include storing information of the previous context in the storage in response to the determining the selected context as the determined context, and processing a new utterance sound based on the stored information of the previous context in response to the processing the user utterance sound.

The method may further include storing information of the previous domain in the storage in response to the determining the detected domain as the determined domain, and processing a new utterance sound based on the stored information of the previous domain in response to the processing the user utterance sound based on the determined domain.

The method may further include determining the confidence between the user utterance sound and the detected domain based on whether an utterance element of the user utterance sound coincides with an utterance element of the detected domain.

The method may further include, in response to the processing the user utterance sound to generate the system response based on a context using a control of a function of the external device in the determined domain, generating a system response for controlling the function of the external device based on information of the function of the external device.

The method may further include receiving new information of the function of the external device that is added in a network, and updating the information of the function of the external device based on the received new information.

The determining may include determining one among the detected domain and the previous domain as the domain to be used to process the user utterance sound, based on utterance history information, and the utterance history information may include at least one among a previously received user utterance sound, information of a domain that was used to process the previously received user utterance sound, and a system response that was generated based on the previously received user utterance sound.

The domain information may include at least one among control information for performing tasks corresponding to the dialogue subjects and dialogue patterns for the dialogue subjects.

A non-transitory computer-readable storage medium may store a program to cause a computer to perform the method.

BRIEF DESCRIPTION OF THE DRAWINGS

The above and/or other aspects will be more apparent by describing exemplary embodiments with reference to the accompanying drawings, in which.

DETAILED DESCRIPTION OF EXEMPLARY EMBODIMENTS

Figure 1:
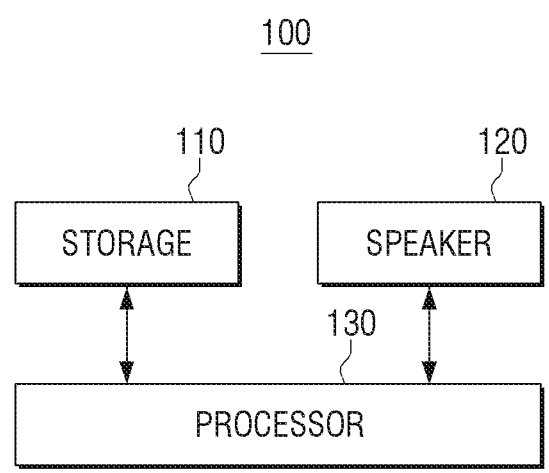
FIG. 1 is a block diagram illustrating a configuration of an electronic device according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

FIG. 1 is a block diagram illustrating a configuration of an electronic device 100 according to an exemplary embodiment.

Referring to FIG. 1, the electronic device 100 includes a storage 110, a speaker 120, and a processor 130. Here, the electronic device 100 may include a device that can recognize a user utterance sound and process a system response that corresponds to the user utterance sound, and may be implemented by various types of electronic devices, such as TV, electronic board, electronic table, large format display (LFD), smart phone, tablet, desktop PC, notebook computer, and home network system server. The electronic device 100 may be implemented in the form of system on chip (SoC) for recognizing the user utterance sound and processing the system response that corresponds to the user utterance sound.

The storage 110 may store domain information that is categorized for dialogue subjects. Here, the storage 110 is a storage medium for storing therein various kinds of programs that are used to operate the electronic device 100, and may be implemented by a memory or a hard disk drive (HDD). For example, the storage 110 may include a ROM for storing programs for an operation of the processor 130 and a RAM for temporarily storing data that is produced during an operation of the controller 150. Further, the storage 110 may further include an electrically erasable and programmable ROM (EEPROM) for storing various kinds of reference data.

The storage 110 may store the domain information that is categorized for the dialogue subjects, and the domain information that is categorized for the dialogue subjects may mean information about groups that are divided in accordance with the subjects to which the user utterance sound belongs. Here, the domain information may include at least one among control information for performing a task that corresponds to the dialogue subject and dialogue patterns for the dialogue subjects.

The storage 110 may store dialogue patterns for service domains, and for this, the storage 110 may be provided with a corpus database for service domains. As described above, the service domains may be divided in accordance with the subjects to which the user utterance sound belongs.

For example, the storage 110 may include a first corpus database for a broadcasting service domain and a second corpus database for a weather service domain.

In this case, the first corpus database may store various dialogue patterns that may be created in the broadcasting service domain. For example, "Which program do you want to know the start time of?" may be stored as a response to "When the program starts?", and "The start time of OOO that you inquired about is ~~" may be stored as a response to "When OOO (broadcasting program name) starts?"

Further, the second corpus database may store dialogue patterns that may occur in the weather service domain. For example, "May I tell you the temperature?" may be stored as a response to "How's the weather in OO (region name)?", and "The temperature in Seoul that you inquired about is ~~" may be stored as a response to "What's the temperature in Seoul?"

Further, the storage 110 may store control commands to match user utterance intentions. For example, if the user utterance intention is channel change, the storage 110 may store a control command for changing a channel of a display device to match the user utterance intention, while if the user utterance intention is reserved recording, the storage 110 may store a control command for executing reserved recording of a program through the display device to match the user utterance intention.

Further, if the user utterance intention is temperature control, the storage 110 may store a control command for controlling the temperature of an air conditioner to match the user utterance intention, while if the user utterance intention is music reproduction, the storage 110 may store a control command for reproducing a sound output device to match the user utterance intention. As described above, the storage 110 may store a control command for controlling various external devices to match the user utterance intentions.

The speaker 120 may output a system response that corresponds to the user utterance sound. Here, the speaker 120 may be implemented by a loudspeaker for outputting the system response in the form of sound, or by an output port, such as a jack, for connecting to an external speaker to output the system response in the form of a system response through the external speaker.

The processor 130 may detect a domain that corresponds to the user utterance sound and create the system response through determination of one among the detected domain and a previous domain to process the user utterance sound on the basis of confidence between the user utterance sound and the detected domain.

If the user utterance sound is input, the processor 130 may analyze the user utterance sound, and detect the domain that corresponds to the user utterance sound through decision of which dialogue subject the user utterance sound corresponds to.

Here, the processor 130 may create a text that corresponds to the user utterance sound through conversion of the user utterance sound into the text using an automatic utterance recognition (ASR) module. The ASR module is a module for converting a voice signal into a text, and may convert the voice signal into the text using various ASR algorithms.

For example, the processor 130 may decide a voice region through detection of a start and an end of the user utterance sound in the received voice signal. The processor 130 may calculate energy of the received voice signal, classify an energy level of the voice signal in accordance with the calculated energy, and detect the voice region through dynamic programming. Further, the processor 130 may create phoneme data through detection of a phoneme that is the minimum unit of the voice on the basis of an acoustic model in the detected voice region, and may convert the user utterance sound into a text through application of an hidden Markov mode (HMM) probability model to the created phoneme data.

Further, the processor 130 may perform various kinds of analyses, such as part of utterance, named entity extraction, information extraction, and semantic analytic, so that the processor 130 can understand the text that corresponds to the user utterance sound using a spoken language understanding (SLU) module.

Thereafter, the processor 130 may detect the domain that corresponds to the user utterance sound through detection of corpus database in which a dialogue pattern that matches the text, into which the user utterance sound is converted, exists.

For example, if a text "When the program starts?" is received, the processor 130 may decide that the user utterance sound corresponds to the broadcasting service domain, while if a text "How's the weather in OO (region name)?" is received, the processor 130 may decide that the user utterance sound corresponds to the weather service domain.

Further, the processor 130 may analyze confidence between the user utterance sound and the detected domain.

The processor 130 may decide the confidence between the user utterance sound and the detected domain on the basis of a confidence score depending on whether at least one utterance element constituting the user utterance sound coincides with at least one utterance element belonging to the detected domain.

For example, the processor 130 may extract a dialogue act, a main action, and a component slot from the user utterance sound. Here, the dialogue act, the main action, and the component slot are included in the utterance element.

Further, the processor 130 may extract the dialogue act and the main action from the user utterance sound using a maximum entropy classifier (MaxEnt), and extract the component slot using a conditional random field (CRF), but is not limited thereto. The processor 130 may also extract the dialogue act, the main action, and the component slot through various known methods.

Here, the dialogue act is a classification standard related to a sentence type, and indicates whether the corresponding sentence is a statement, a request, a why-question WH-Question, or a yes-no question YN-Question. The main action is meaningful information that the corresponding utterance indicates a desired action through a dialogue in a domain. For example, the main action in the broadcasting service domain may include TV on/off, program search, program time search, and program reservation. The component slot is information that is added to specify object information on a domain appearing in the utterance, that is, the meaning of an action that is intended in the domain. For example, in the broadcasting service domain, the component slot may include a genre, a program name, a start time, a channel name, and a character name.

Further, the processor 130 may calculate the confidence score depending on whether at least one among the dialogue act, the main action, and the component slot, which are extracted from the user utterance sound, coincides with at least one utterance element belonging to the detected domain, and the processor 130 may decide the confidence between the user utterance sound and the detected domain on the basis of the calculated confidence score.

Further, the processor 130 may determine one among the detected domain and a previous domain to process the user utterance sound on the basis of the decided confidence between the user utterance sound and the detected domain.

For example, if it is assumed that the previously received user utterance sound is related to weather and the previous domain is related to weather, the processor 130 may detect a domain related to broadcasting in the case in which the currently received user utterance sound is "When the program starts?" Further, if the confidence score between the currently received user utterance sound "When the program starts?" and the domain related to the weather is 10, and the confidence score between the user utterance sound "When the program starts?" and the domain related to the broadcasting is 80, the processor 130 may determine that the domain to process the user utterance sound "When the program starts?" is the domain related to the broadcasting rather than the previous domain (domain related to the weather).

Further, for example, if it is assumed that the previously received user utterance sound is "Please close the window if it rains," and the domain related to the weather is determined as the domain that processes this, the processor 130 may detect the domain related to the weather and the domain related to the broadcasting in the case in which the currently received user utterance sound is "Please turn on the TV if it rains." Further, if the confidence score between the currently received user utterance sound "Please turn on the TV if it rains" and the domain related to the weather is 70, and the confidence score between the user utterance sound "Please turn on the TV if it rains" and the domain related to the broadcasting is 50, the processor 130 may determine that the domain to process the user utterance sound "Please turn on the TV if it rains" is the same as the domain related to the weather that is the previous domain.

That is, even if the domain that processes the previous user utterance sound has already been determined, the processor 130 may determine the domain to process a newly received user utterance sound whenever the user utterance sound is newly received.

Further, in the case in which the confidence score between the currently received user utterance sound and the previous domain is similar to the confidence score between the currently received user utterance sound and the domain that corresponds to the currently received user utterance sound, and thus it is not possible to decide the domain to proves the currently received user utterance sound, the processor 130 may create a message for asking a user which domain the currently received user utterance sound is related to and output the message through the speaker 120.

On the other hand, the processor 130 may decide user utterance intention that is included in the user utterance sound using the extracted dialogue act, main action, and component slot.

For example, if a user utterance sound "When OOO (broadcasting program name) is broadcast?" is received, the processor 130 may search a corpus database in which a dialogue pattern that matches the user utterance sound exists, and detect that the user utterance sound "When OOO is broadcast?" is included in a broadcasting service domain.

Thereafter, the processor 130 decides that the sentence type of the corresponding voice is of a question type through the dialogue act, and decides that a user wants to know the program start time of OOO through the main action and the component slot. As a result, the processor 130 may decide that the utterance intention that is included in the user voice is to inquire about the program start time of OOO.

Further, in consideration that the user utterance sound corresponds to the broadcasting service domain and the utterance intention is to inquire about the program start time of OOO, the processor 130 may finally decide that the user utterance sound is to inquire about the program start time of OOO in the broadcasting service domain.

The processor 130 may determine the domain to process the user utterance sound whenever the user utterance sound is received, and may decide the user's utterance intention in each domain on the basis of the context included in the decided domain.

The voice recognition based processing system in the related art may decide the user's utterance intention on the basis of only the context in the determined domain in the case in which the user utterance sound is received and the domain to process the user utterance sound is decided. However, the processor 130 according to an exemplary embodiment may determine the domain to process the user utterance sound whenever the user utterance sound is received, and may decide the user utterance intention in each domain on the basis of the context that belongs to the determined domain to be able to process various kinds of user utterance sounds.

On the other hand, if the domain to process the user utterance sound is determined, the processor 130 may create a system response that corresponds to the user utterance sound.

For example, if it is decided that the user utterance sound is to inquire about the program start time of OOO in the broadcasting service domain, the processor 130 extracts a response "The start time of OOO that you inquired about is ~~" from the corpus database of the broadcasting service domain. In this case, the processor 130 may search for the broadcasting start time of OOO using electronic program guide (EPG) information that is pre-stored in the storage 110, and may create a system response "The start time of OOO that you inquired about is 07:00, Saturday."

Further, the processor 130 may create a control command for performing a function that corresponds to the user's utterance intention as the system response.

For example, it may be assumed that a user utterance sound "Please reserve OOO (broadcasting program name)" is received. In this case, the controller 330 may search a corpus database in which a dialogue pattern that matches the user's voice exists, and may decide that the user's voice "Please reserve OOO" is included in the broadcasting service domain.

Further, the processor 130 may decide that the corresponding voice is in the form of a sentence related to a request through the dialogue act, and may decide that a user wants program reservation of OOO through the main action and the component slot. As a result, the processor 130 may decide that the utterance intention that is included in the user's voice is to request program reservation of OOO.

Thereafter, the processor 130 may detect a control command that corresponds to the utterance intention to request the program reservation of OOO from the storage 110, and may create a control command for performing reserved recording of OOO in the display device. In this case, the processor 130 may extract a response message "program recording that you requested has been reserved," which is in response to the utterance intention to request the program reservation of OOO, from the corpus database of the broadcasting service domain, and may output the extracted response message through the speaker 120.

On the other hand, the storage 110 may categorize dialogue subjects that correspond to the respective domains for contexts to store the categorized dialogue subjects, and the processor 130 may decide a context that corresponds to the user utterance sound in the case in which the previous domain is determined as the domain to process the user utterance sound, and create the system response through determination of one among the decided context and a previous context to process the user utterance sound on the basis of confidence between the user utterance sound and the decided context.

Here, the category for each context of a dialogue subject that corresponds to each domain stored in the storage 110 may correspond to a corpus database for the above-described domain. That is, the context related to the dialogue subject that corresponds to each domain may include various kinds of dialogue patterns that can be created in each domain, and in addition to such dialogue patterns, the context may include words, such as wordings used in dialogue subjects, proper nouns, and place names, which are categorized in accordance with the dialogue subjects.

Further, if the previous domain is determined as the domain to process the currently received user utterance sound, the processor 130 may decide a context that corresponds to the user utterance sound, and may create the system response by determining the context to process the currently received user utterance sound through comparison of the confidence between the currently received user utterance sound and the context that corresponds to the user utterance sound with the confidence between the currently received user utterance sound and the previous context.

For example, If the previously received user utterance sound is "When viewing the TV in the large room, please turn off lamps in other rooms and keep the large room cool and dark," the processor 130 may determine the domain related to the display device as the domain to process the previously received user utterance sound, and may decide that the context is related to the lamps and temperature when viewing the TV in the large room. Thereafter, if the received user utterance sound is "What channel do I see the movie on?," the processor 130 may determine the domain related to the display device as the domain to process the user utterance sound in the same manner as the previous domain, and may decide that the context that corresponds to "What channel do I see the movie on?" is related to channel information. Further, if the confidence score between the user utterance sound "What channel do I see the movie on?" and the context related to the channel information is 80, and the confidence score between the user utterance sound "What channel do I see the movie on?" and the lamps and temperature when viewing the TV is 40, the processor 130 may determine that the context to process the user utterance sound "What channel do I see the movie on?" is the context related to the channel information.

That is, even if the domain that processes the previous user utterance sound has already been determined, the processor 130 may determine the domain to process a newly received user utterance sound whenever the user utterance sound is newly received. Further, even if the domain to process the newly received user utterance sound is the same as the previous domain, the processor 130 may determine the context to process the newly received user utterance sound among a plurality of contexts included in the domain.

Further, if the determined context is the same as the previous context, the processor 130 processes the newly received user utterance sound in the previous context, while if the determined context is different from the previous context, the processor 130 processes the newly received user utterance sound in the determined context.

On the other hand, if the decided context is determined as the context to process the user utterance sound, the processor 130 may store information related to the previous context in the storage 110, and if the utterance sound processing in the decided context is ended, the processor 130 may process new utterance sound on the basis of the stored information related to the previous context.

For example, if the user utterance sound "When viewing the TV in the large room, please turn off lamps in other rooms and keep the large room cool and dark" is received, the processor 130 may determine the domain related to the display device as the domain to process the received user utterance sound, and may decide that the context is related to the lamps and temperature when viewing the TV in the large room. In this case, the processor 130 may create a system response, such as "Will I turn off the lamps in the living room and the passage together?" to correspond to the user utterance sound.

Thereafter, if the user utterance sound "What channel do I see the movie on?" is received, the processor 130 may determine the domain related to the display device as the domain to process the user utterance sound in the same manner as the previous domain, and may decide that the context that corresponds to "What channel do I see the movie on?" is related to channel information. Accordingly, the processor 130 may store information, which is related to the context related to the lamps and temperature when viewing the TV, in the storage 110, and the context related to the channel information may be used to process the received user utterance sound. Here, the information that is related to the context related to the lamps and temperature during viewing of the TV may include the received user utterance sound in the context related to the lamps and temperature, data that is used to process the received user utterance sound, and information about the system response created to correspond to the received user utterance sound.

On the other hand, if the processing of the received user utterance sound in the context related to the channel information is ended, the processor 130 may read again the information that is related to the context related to the lamps and temperature during viewing of the TV from the storage 110, and may process the newly received user utterance sound on the basis of the read information.

For example, if the processing of the received user utterance sound in the context related to the channel information is ended, the processor 130 may read again the information that is related to the context related to the lamps and temperature during viewing of the TV from the storage 110, and may create a voice message "I will proceed with the previously created dialogue" to output the created voice message through the speaker 120.

Further, the processor 130 may output again the voice message "Will I turn off the lamps in the living room and the passage together?" previously created on the basis of the context related to the lamps and temperature during viewing of the TV, through the speaker 120. If new utterance sound "Please turn off the lamp in the living room and turn on the lamp in the passage" is received from a user, the processor 130 may process the user utterance sound "Please turn off the lamp in the living room and turn on the lamp in the passage" on the basis of the context related to the lamps and temperature during viewing of the TV.

The above-described example refers to a case in which the previous domain is decided as the domain to process the user utterance sound, and a case in which the domain that is detected to correspond to the user utterance sound rather than the previous domain is determined as the domain to process the user utterance sound will be described.

If the domain that is detected to correspond to the user utterance sound is determined as the domain to process the user utterance sound, the processor 130 may store information related to the previous domain in the storage 110, and may process the new utterance sound on the basis of the stored information related to the previous domain if the processing of the utterance sound in the detected domain is ended.

For example, if the user utterance sound "When viewing the TV in the large room, please turn off lamps in other rooms and keep the large room cool and dark" is received, the processor 130 may determine this as the domain related to the display device, and process the user utterance sound in the domain related to the display device. In this case, the processor 130 may create the system response, such as "Will I turn off the lamps in the living room and the passage together?"

Thereafter, if the user utterance sound "Oh, please register a wedding schedule next weekend" is received, the processor 130 may detect a domain that corresponds to the user utterance sound "Oh, please register a wedding schedule next weekend" as the domain related to the schedule, and may determine the domain to process the user utterance sound "Oh, please register a wedding schedule next weekend" as the domain related to the schedule on the basis of the confidence between the user utterance sound and the domain related to the schedule and the domain related to the display device.

In this case, the processor 130 may store information related to the previous domain, that is, information that is related to the domain related to the display device, in the storage 110, and may create a system response, such as "Schedule registration has been completed," through processing of a user utterance sound, such as "12:00, Saturday," that is received from a user through the domain related to the schedule to output the created system response through the speaker 120. If the utterance sound process in the domain related to the schedule is ended, the processor 130 may read again information that is related to the domain related to the display device from the storage 110, and may create a voice message, such as "I will proceed with the dialogue previously created" to output the created voice message through the speaker 120.

Further, the processor 130 may output again the voice message "Will I turn off the lamps in the living room and the passage together?" previously created on the basis of the context related to the lamps and temperature during viewing of the TV, through the speaker 120. If new utterance sound "Please turn off the lamp in the living room and turn on the lamp in the passage" is received from a user, the processor 130 may process the user utterance sound "Please turn off the lamp in the living room and turn on the lamp in the passage" on the basis of the domain related to the display device.

Figure 2:
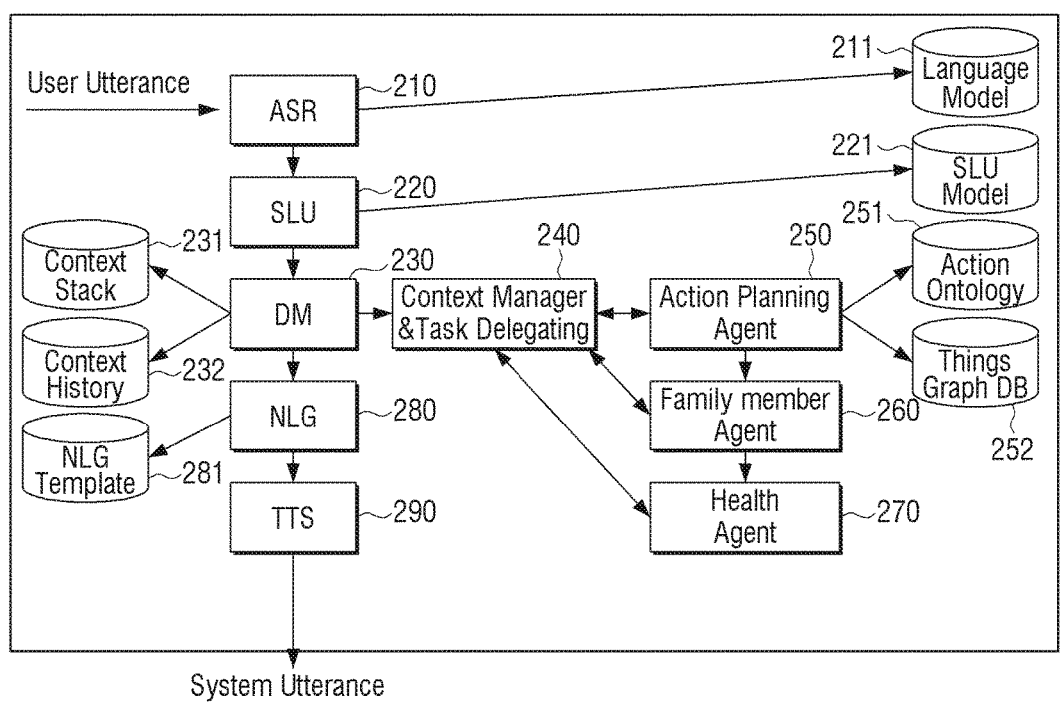
FIG. 2 is a diagram explaining a process for processing a user utterance sound according to an exemplary embodiment.

FIG. 2 is a diagram explaining a process for processing a user utterance sound according to an exemplary embodiment.

Referring to FIG. 2, if a user utterance sound is input, the processor 130 may convert a voice signal or user utterance into a text with reference to a language model 211 using an ASR module 210, and may perform various kinds of analyses so that the processor 130 can understand a text input with reference to a SLU model 221 using a SLU module 220.

Further, the processor 130 may analyze the user's utterance sound using a dialogue manager (DM) module 230, analyze user's utterance intention, and create various natural language dialogues. The processor 130 may detect a domain that corresponds to the user utterance sound using the DM module 230, and may determine one among the detected domain and the previous domain to process the user utterance sound on the basis of confidence between the user utterance sound and the detected domain.

Further, the processor 130 may decide a context that corresponds to the user utterance sound using the DM module 230, and may determine one among the decided context and the previous context to process the user utterance sound on the basis of the confidence between the user utterance sound and the decided context. The processor 130 may store information related to the previous domain and information related to the previous context in a context stack 231, and may store data related to dialogue contents between a user and an electronic device 100 in a context history 232. Here, the context stack 231 means a storage space for storing information related to the previous context in the case of switching over to another dialogue subject during a dialogue with a user, and the context history 232 means a storage space for storing data related to the dialogue between the user and the electronic device 100.

Further, the processor 130 may monitor the dialogue between the electronic device 100 and the user using a context manager & task delegating module 240, and may support information that can be utilized in the dialogue with the user.

Further, the processor 130 may process the user utterance sound through control of at least one among an action planning agent 250, a family member agent 260, and a health agent 270 using the context manager & task delegating module 240.

On the other hand, the processor 130 may control functions of at least one external device on the basis of a user utterance sound analyzed by the DM module 230, user utterance intention, a domain to process the user utterance sound, and a context using the action planning agent 250.

Further, the processor 130 may determine which external device the processor 130 uses to perform a function that corresponds to the user utterance sound on the basis of the functions and states of the external devices using the action planning agent 250. Here, the processor 130 may decide the functions and the states of the external devices on the basis of action ontology 251 and things graph DB 252 using the action planning agent 250.

On the other hand, the processor 130 may convert the system response that is created using the SLU module 220 into a text so that that user can understand the system response, using a natural language generation (NLG) module 280 and an NLG template 281.

Further, the processor 130 may convert the text into a voice signal or system utterance using a text to utterance (TTS) module 290. Accordingly, the processor 130 may convert the created system response into the voice signal to output the converted voice signal through the speaker 120.

Figure 3:
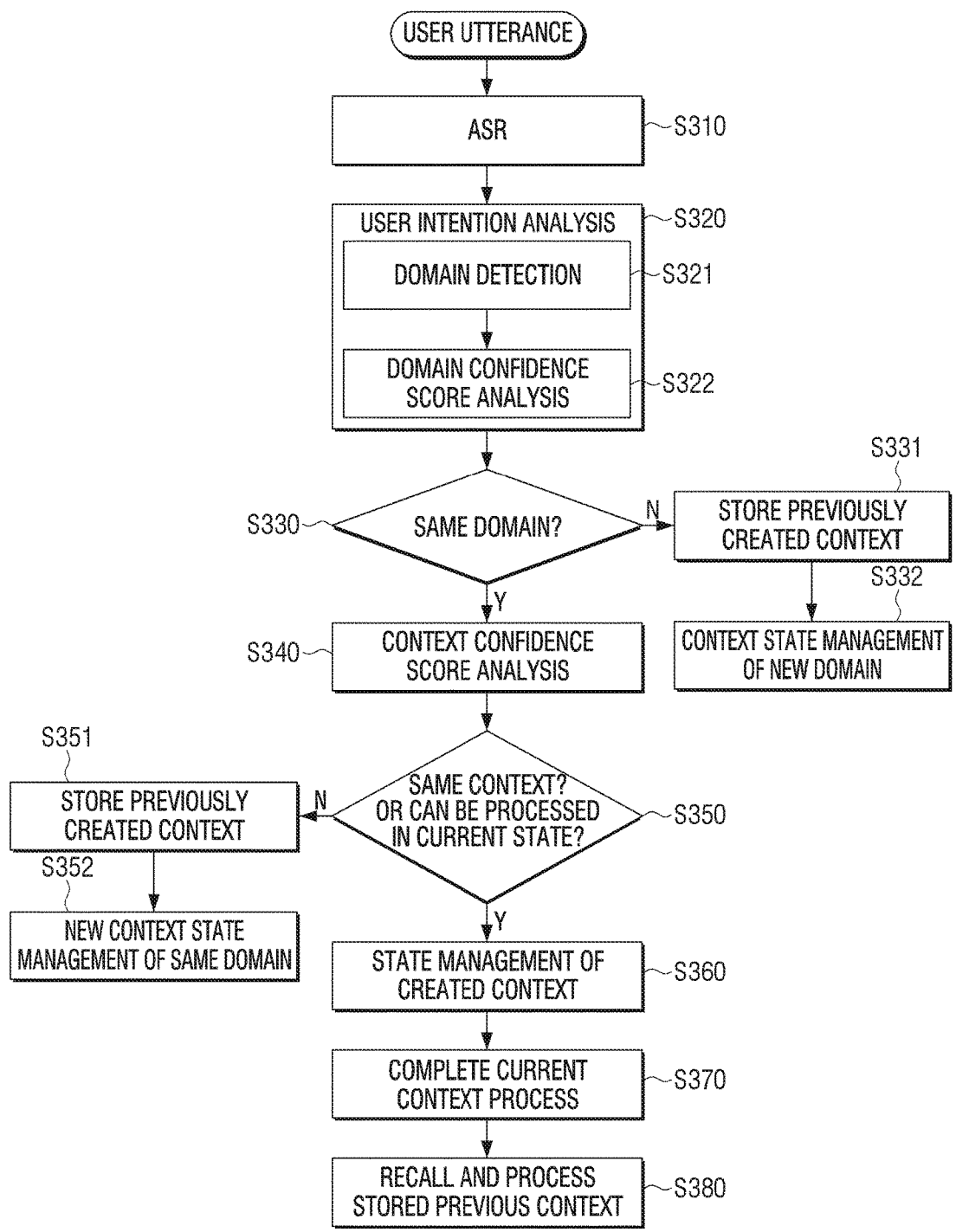
FIG. 3 is a flowchart explaining a process for processing a user utterance sound according to an exemplary embodiment.

FIG. 3 is a flowchart explaining a process for processing a user utterance sound according to an exemplary embodiment.

Referring to FIG. 3, if a user utterance sound is input, the processor 130 converts a voice signal into a text using the ASR module (S310). In analyzing a user utterance intention (S320), the processor 130 detects a domain that corresponds to the user utterance sound (S321), and analyzes confidence between the user utterance sound and the detected domain and the previous domain (S322). Because the detection of the domain that corresponds to the user utterance sound, the analysis of the confidence between the user utterance sound and the detected domain and the previous domain, and the analysis of the user utterance intention have been described, the detailed explanation thereof will be omitted.

Thereafter, the processor 130 determines whether the domain to process the user utterance sound is the same as the previous domain on the basis of the confidence between the user utterance sound and the detected domain and the previous domain (S330).

If it is determined that the domain to process the user utterance sound is the same as the previous domain, the processor 130 decides the context that corresponds to the user utterance sound and analyzes the confidence score between the user utterance sound and the decided context and the previous context (S340).

Further, the processor 130 determines whether the context to process the user utterance sound is the same as the previous context or whether the user utterance sound can be processed in the present state on the basis of the confidence score between the user utterance sound and the decided context and the previous context (S350).

If it is determined that the context to process the user utterance sound is the same as the previous context, the processor 130 processes the state management on the basis of the previous context (S360). Further, the processor 130 completes the process of the received user utterance sound on the basis of the previous context (S370). Further, the processor 130 reads again the context that is pre-stored before the current user utterance sound is received from the storage 110 to process a new user utterance sound (S380).

On the other hand, if it is determined that the domain to process the user utterance sound is the domain that corresponds to the detected user utterance sound rather than the previous domain, the processor 130 stores information related to the previous domain and the previous context (S331), and processes the user utterance sound through performing of context state management of the domain that corresponds to the detected user utterance sound (S332).

Further, if it is determined that the context to process the user utterance sound is the context that corresponds to the user utterance sound rather than the previous context even in the case in which the domain to process the user utterance sound is determined to be the same as the previous domain, the processor 130 stores information related to the context previously created (S351), and processes the user utterance sound through performing of new context state management in the previous domain (S352).

Figure 4:
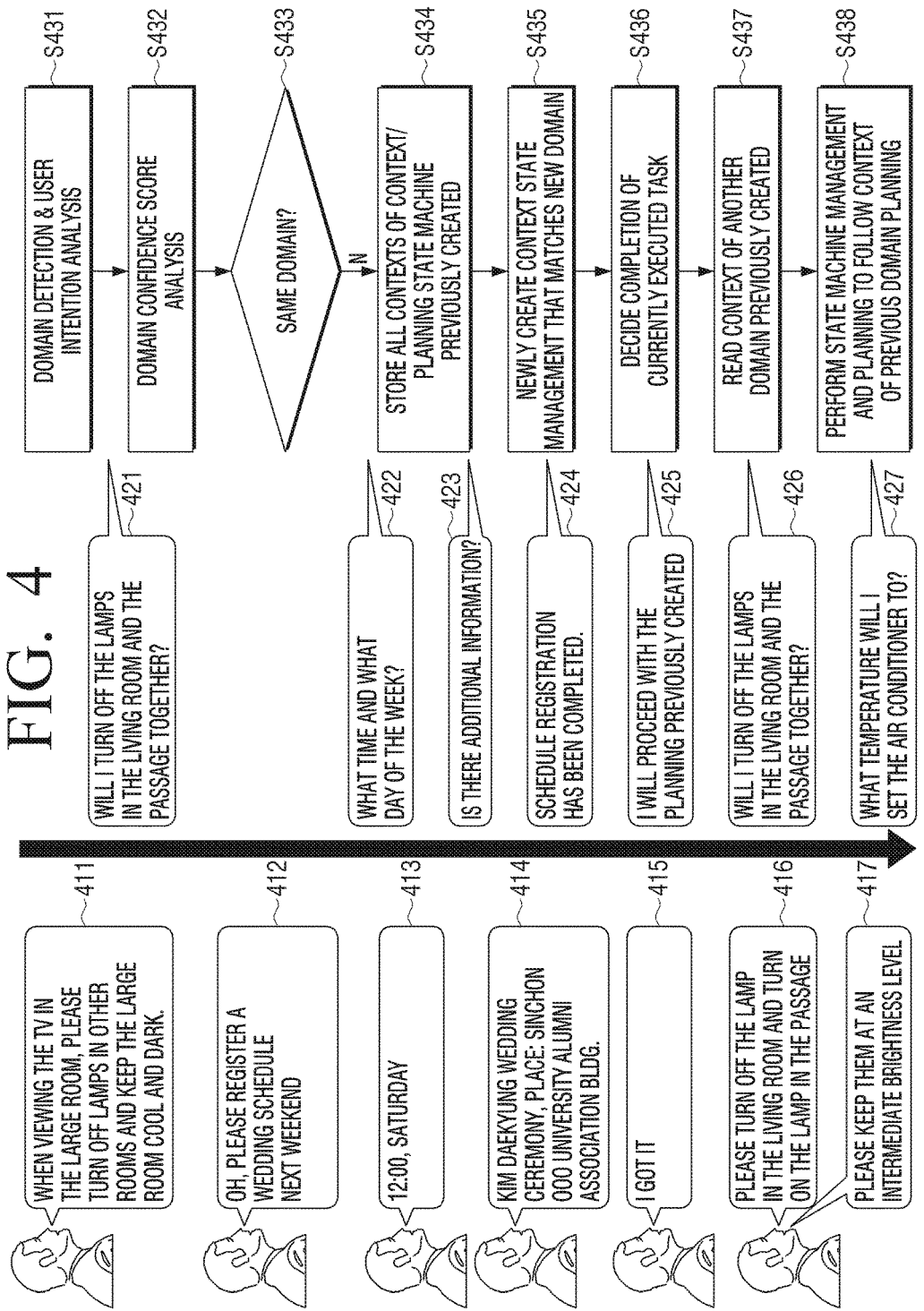
FIG. 4 is a diagram explaining a process that is performed in the case in which a domain to process a user utterance sound is changed according to an exemplary embodiment.

FIG. 4 is a diagram explaining a process that is performed in the case in which a domain to process a user utterance sound is changed according to an exemplary embodiment.

For example, if a user utterance sound "When viewing the TV in the large room, please turn off lamps in other rooms and keep the large room cool and dark" is received from a user (411), the processor 130 may determine a domain related to lamps and temperature during viewing of the TV as a domain to process a user utterance sound "When viewing the TV in the large room, please turn off lamps in other rooms and keep the large room cool and dark," and process the user utterance sound to create and output a system response "Will I turn off the lamps in the living room and the passage together?" (421).

Thereafter, if the user utterance sound "Oh, please register a wedding schedule next weekend" is received (412), the processor 130 may detect a domain related to the schedule that corresponds to the received user utterance sound "Oh, please register a wedding schedule next weekend," analyze the user utterance intention (S431), and analyze confidence between the user utterance sound and the detected domain related to the schedule (S432). The processor 130 may determine whether the domain to process the user utterance sound "Oh, please register a wedding schedule next weekend" is the same as the previous domain related to the lamps and temperature during viewing of the TV (S433). When it is determined that the domain to process the user utterance sound "Oh, please register a wedding schedule next weekend" is the domain related to the schedule rather than the previous domain related to the lamps and temperature during viewing of the TV, the processor 130 may store information related to the context created in the previous domain in the storage 110 (S434), and process the user utterance sound through creation of a context that matches the newly determined domain related to the schedule (S435). As illustrated in FIG. 4, the processor 130 may create and output a system response "What time and what day of the week?" (S422), and if a user utterance sound "12:00, Saturday" is received from a user in response to this, the processor 130 may create and output a system response "Is there any additional information?" (423) while maintaining the same context in the domain related to the schedule. Further, if a user utterance sound "Kim Daekyung wedding ceremony, Place: Sinchon OOO University Alumni Association Bldg." is received from a user (414), the processor 130 may create and output a system response "Schedule registration has been completed" (424) while maintaining the same context in the domain related to the schedule, and in response to this, the processor 130 may receive a user utterance sound "I got it" from the user (415). Accordingly, the processor 130 may decide that the currently executed task is completed (S436).

Thereafter, the processor 130 may read the previously created domain related to the lamps and temperature during viewing of the TV and the related context from the storage 110 (S437), and may process new utterance sound that is received from a user on the basis of the previous domain and the related context (S438).

For example, the processor 130 may output a system response "I will proceed with the planning previously created," and if a user utterance sound "Please turn off the lamp in the living room and turn on the lamp in the passage" is received from the user, the processor 130 may process the user utterance sound on the basis of the domain related to the lamps and temperature during viewing of the TV, which is the previous domain, and the related contexts, and may create and output a system response "Will I turn off the lamps in the living room and the passage together?" (426). If a user utterance sound "Please keep them at an intermediate brightness level" is received from the user in response to the system response (417), the processor 130 may create and output a system response, such as "What temperature will I set the air conditioner to?" (427) while maintaining the domain related to the lamps and temperature and the related context during viewing of the TV.

Figure 5:
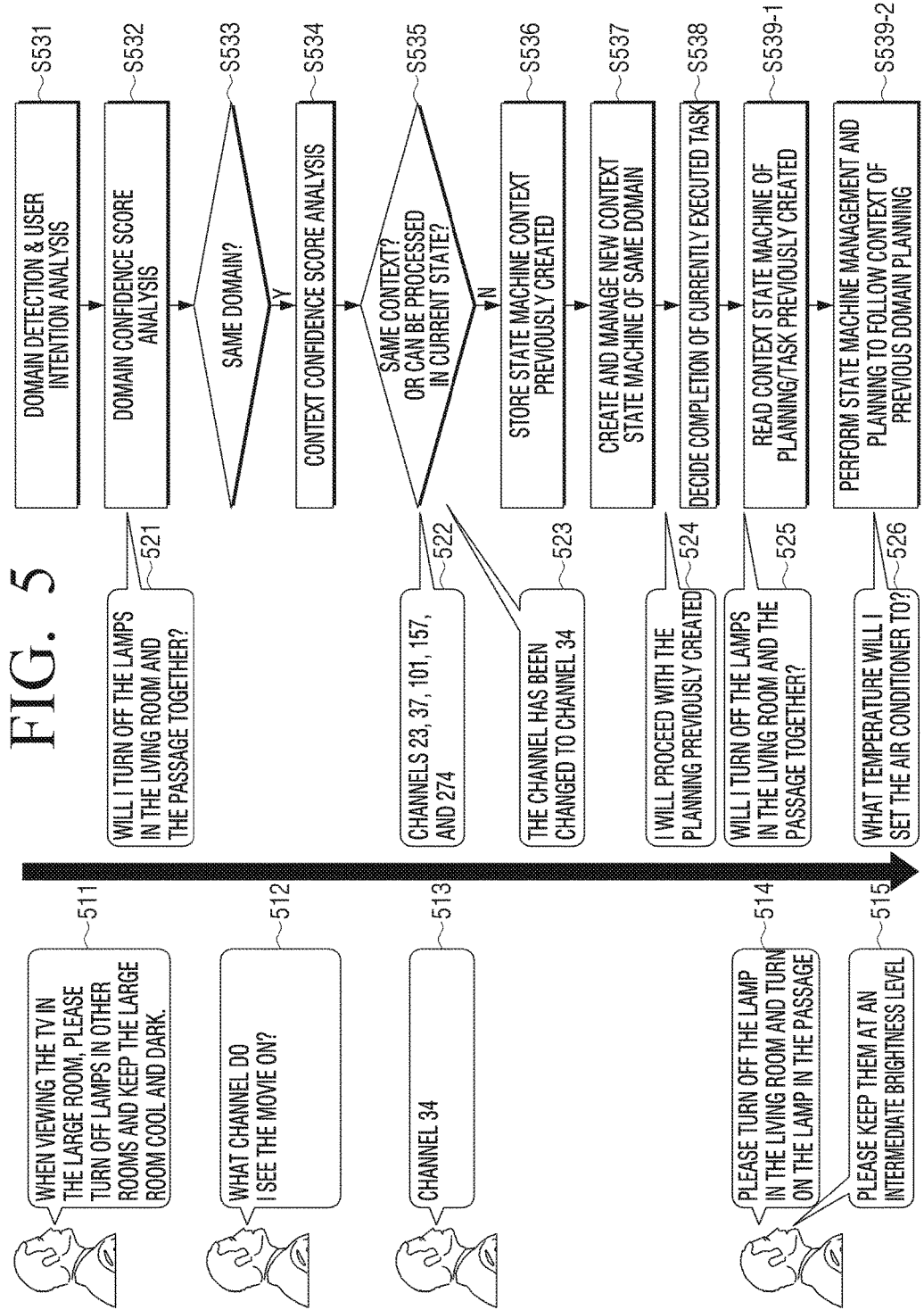
FIG. 5 is a diagram explaining a process that is performed in the case in which a domain to process a user utterance sound is not changed according to an exemplary embodiment.

FIG. 5 is a diagram explaining a process that is performed in the case in which a domain to process the user utterance sound is not changed according to an exemplary embodiment.

For example, if a user utterance sound "When viewing the TV in the large room, please turn off lamps in other rooms and keep the large room cool and dark" is received from a user (511), the processor 130 may determine a domain related to lamps and temperature during viewing of the TV as a domain to process the user utterance sound "When viewing the TV in the large room, please turn off lamps in other rooms and keep the large room cool and dark," and process the user utterance sound to create and output a system response "Will I turn off the lamps in the living room and the passage together?" (521).

Thereafter, if a user utterance sound "What channel do I see the movie on?" is received from the user (512), the processor 130 may detect a domain related to a broadcasting program that corresponds to the received user utterance sound "What channel do I see the movie on?", analyze a user utterance intention (S531), analyze confidence between the user utterance sound and the detected domain related to a broadcasting program (S532). The processor 130 may determine whether the domain to process the user utterance sound "What channel do I see the movie on?" is the same as the previous domain related to the lamps and temperature during viewing of the TV in accordance with the analyzed confidence result (S533). When it is determined that the domain to process the user utterance sound "What channel do I see the movie on?" is the same as the previous domain related to the lamps and temperature during viewing of the TV, the processor 130 may analyze the confidence between the user utterance sound "What channel do I see the movie on?" and the context related to the channel information that is detected corresponding to the user utterance sound in the domain related to the lamps and temperature during viewing of the TV (S534). In accordance with the confidence analysis result, the processor 130 may decide whether the context to process the user utterance sound "What channel do I see the movie on?" is the same as the context related to the lamps and temperature during viewing of the TV, which is the previous context (S535). The processor 130 may determine the context to process the user utterance sound "What channel do I see the movie on?" as the context related to the detected channel information, which is not the previous context, and thus may store the information related to the context previously created (S536).

Further, the processor 130 may process the user utterance sound through creation of a context related to new channel information in the domain related to the lamps and temperature during viewing of the TV (S537).

That is, in response to the user utterance sound "What channel do I see the movie on?" the processor 130 may create and output a system response, such as "Channels 23, 37, 101, 157, and 274," (522) with respect to the user utterance sound. In this case, if the user utterance sound "Channel 34" is received from a user (513), the processor 130 may create and output a system response, such as "The channel has been changed to Channel 34" (523).

Thereafter, the processor 130 may decide that the currently executed task has been completed (S538), read the previously created context related to the lamps and temperature during viewing of the TV from the storage 110 (S539-1), and process new utterance sound that is received from the user on the basis of the read context (S539-2). For example, the processor 130 may output a system response "I will proceed with the planning previously created," (524), and if a user utterance sound "Please turn off the lamp in the living room and turn on the lamp in the passage" is received from the user (514), the processor 130 may process the user utterance sound on the basis of the context related to the lamps and temperature during viewing of the TV, which is the previous context, and may create and output a system response "Will I turn off the lamps in the living room and the passage together?" (525). If a user utterance sound "Please keep them at an intermediate brightness level" is received from the user in response to the system response (515), the processor 130 may create and output a system response, such as "What temperature will I set the air conditioner to?" (526) while maintaining the context related to the lamps and temperature during viewing of the TV.

Figure 6:
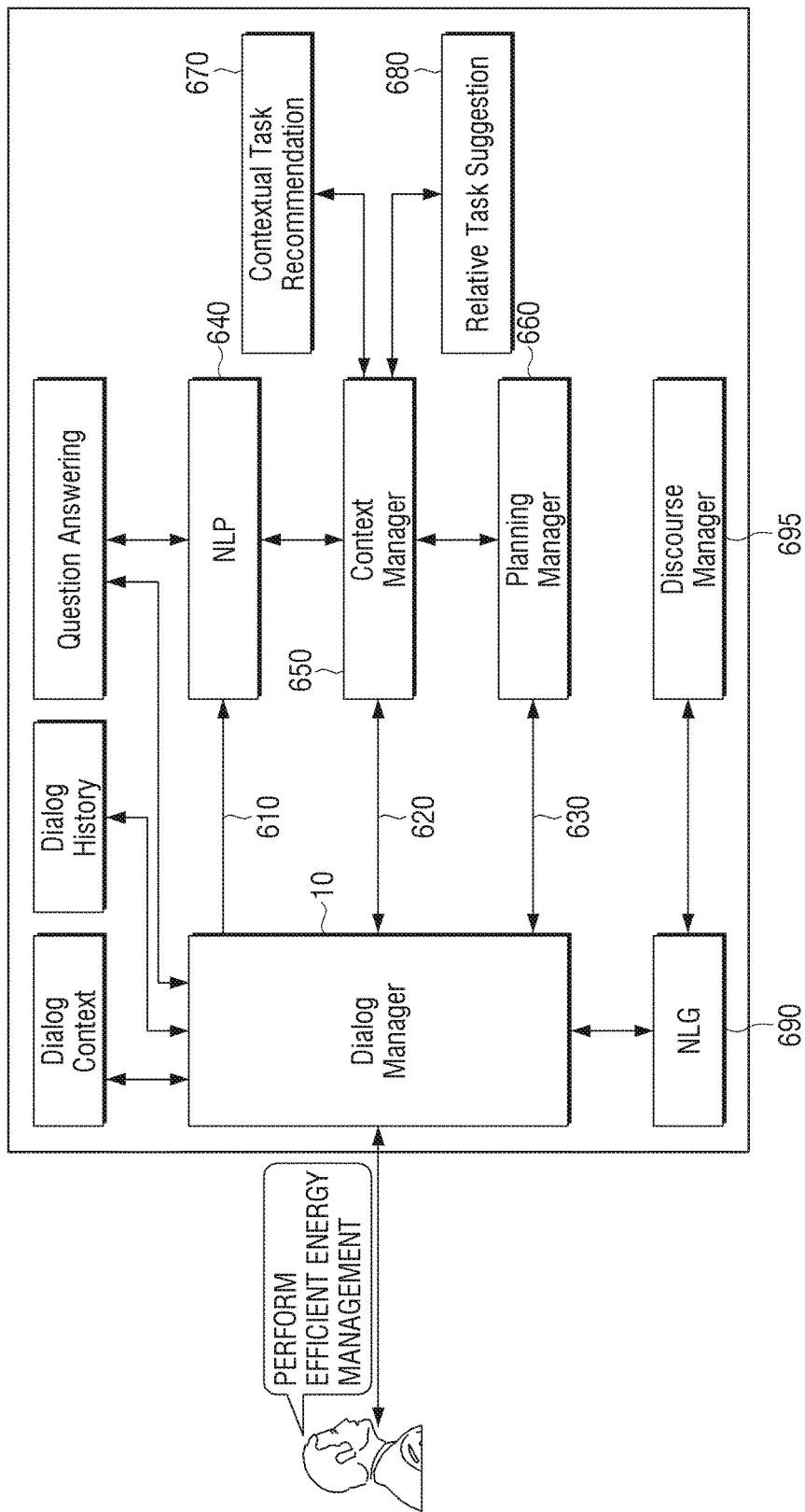
FIG. 6 is a diagram explaining a process that is performed by a dialogue manager (DM) module according to an exemplary embodiment.

FIG. 6 is a diagram explaining a process that is performed by a DM module according to an exemplary embodiment.

Referring to FIG. 6, if a user utterance sound "Please perform efficient energy management" is received, the processor 130 may control a dialog manager 10 to analyze the user utterance intention using an natural language processing (NLP) module 640 with reference to modules of dialog context, dialog history, and question answering. For example, with respect to the user utterance sound "Please perform efficient energy management," the dialog manager 10 may transmit information about contents of an unclearly understood portion of the user utterance sound to the NLP module 640 (610), and analyze accurate meaning of the user utterance sound and the utterance intention through applying of unnecessary or unused energy management or efficient performance values using the NLP module 640.

Further, if the dialog manager 10 requests information that is used for the unclear contents, conditions, or selection from a context manager module 650 (620), the processor 130 may control the context manager module 650 to check contexts for various external devices related to the user utterance sound "Please perform efficient energy management," to recommend helpful tasks through analysis of the context related to the user utterance sound (670), or to propose related tasks (680).

Further, if a planning manager module 660 is requested to provide the contents that are used during planning, the processor 130 may control the planning manager module 660 to perform action planning to provide an appropriate system response that corresponds to the user utterance sound "Please perform efficient energy management" through an appropriate combination of various external devices.

The processor 130 may control a NLG module 690 to convert the system response that is created to correspond to the user utterance sound into a text.

The processor 130 may control a discourse manager module 695 to create the system response on the basis of the contents and the utterance intention of the user utterance sound.

Figure 7:
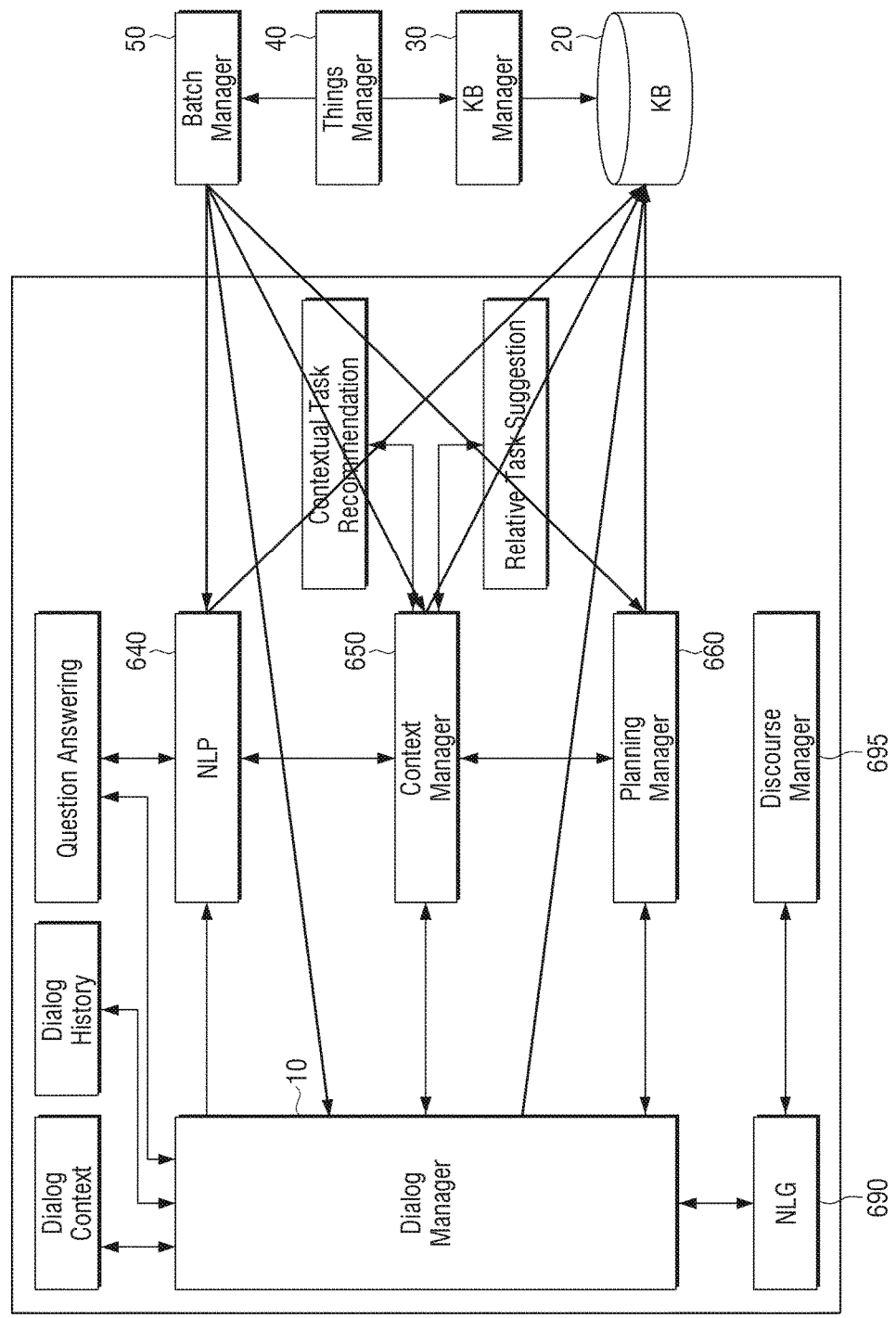
FIG. 7 is a diagram explaining a process that is performed by a system including a database in which information about an electronic device and an external device is stored according to an exemplary embodiment.

FIG. 7 is a diagram explaining a process that is performed by a system including a database in which information about the electronic device 100 and an external device is stored according to an exemplary embodiment.

Referring to FIG. 7, if the dialog manager 10, the NLP 640, the context manager 650, and the planning manager 660 request information about functions, performances, and features of external devices from a database (KB) 20 that stores information about the external devices, a KB manager 30 and a things manager 40, which control the database (KB) 20 that stores the information about the external devices, may process the received request. A batch manager 50 may transmit the information about the functions, performances, and features of the external devices to the dialog manager 10, the NLP 640, the context manager 650, and the planning manager 660.

Accordingly, the processor 130 may process a user utterance sound through the dialog manager 10, the NLP 640, the context manager 650, and the planning manager 660 on the basis of the received information about the functions, performances, and features of the external devices, and may create and output a system response.

Figure 8:
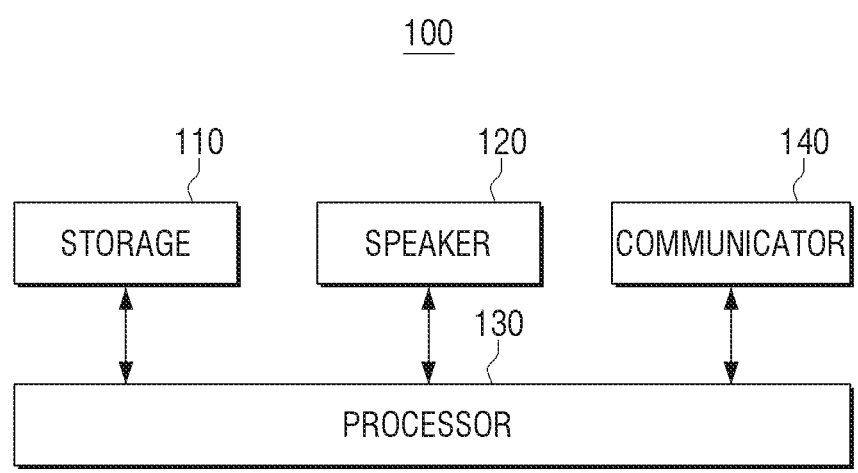
FIG. 8 is a block diagram illustrating a configuration of an electronic device according to another exemplary embodiment.

FIG. 8 is a block diagram illustrating a configuration of the electronic device 100 according to another exemplary embodiment.

Referring to FIG. 8, the electronic device 100 includes the storage 110, the speaker 120, the processor 130, and a communicator 140. Because the storage 110, the speaker 120, and the processor 130 have been described, the detailed explanation thereof will be omitted.

The communicator 140 may perform communication with at least one external device. If a system response that corresponds to a utterance sound is created on the basis of a context that uses a control of a function of the at least one external device in a domain in which a system response that corresponds to the utterance sound is determined, the processor 130 may create the system response for controlling the function of the at least one external device on the basis of information related to the external device.

If a user utterance sound "Please lower indoor temperature" is received, the processor 130 may determine a domain related to temperature as the domain to process the user utterance sound, and if a system response is created on the basis of the context that uses the control of the function of the at least one external device in the domain related to the temperature, the processor 130 may search for external devices related to a temperature control function among various external devices arranged in the home. For example, the processor 130 may search for external devices, such as an air conditioner, a window, and a lamp, in relation to the temperature control function, and may transmit control commands for performing functions of lowering the temperature through turn-on of the air conditioner, heightening energy efficiency through closing of the window, and turning off the lamp to the air conditioner, the window, and the lamp, respectively.

Further, the processor 130 may decide at least one external device that meets the system response corresponding to the user utterance sound in consideration of the functions, performances, and features of the various external devices to control the temperature in the domain related to the temperature.

Here, the storage 110 may further store information on functions of external devices, and the communicator 140 may receive function information of at least one external device added in a predetermined network.

Further, the processor 130 may update the information stored in the storage 110 on the basis of the received function information of the at least one external device.

For example, if a new display device is additionally provided in the home under the assumption that the predetermined network is a home network, the communicator 140 may receive the function information of the new display device added in the home network, and the processor 130 may update the information stored in the storage 110 on the basis of the received function information of the new display device. Accordingly, the processor 130 may create a system response in further consideration of the function information of the new added display device in processing a user utterance sound that is received later.

On the other hand, the processor 130 may create the system response through determination of the domain to process the user utterance sound on the basis of utterance history information, and the utterance history information may include at least one among a previously received user utterance sound, information related to the domain that has processed the previously received user utterance sound, and the system response that corresponds to the previously received user utterance sound.

For example, if it is not possible to detect the domain or context that corresponds to the user utterance sound or it is not possible to determine the domain or context to process the user utterance sound on the basis of the confidence between the user utterance sound and the detected domain or context, the processor 130 may determine the domain or context to process the user utterance sound on the basis of the utterance history information.

Further, the utterance history information may include a previously received user utterance sound, information related to the domain that has processed the previously received user utterance sound and the related context, information on external devices that are referred to when the system response that corresponds to the previously received user utterance sound is created, and information on functions of the external devices.

Figure 9:
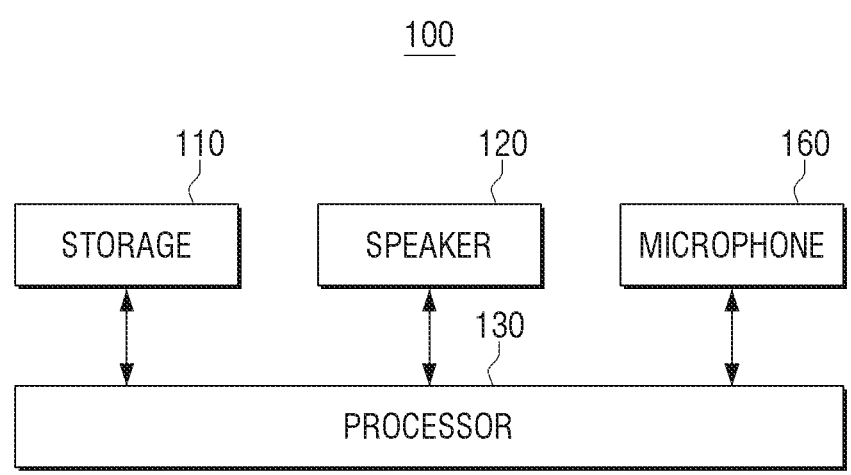
FIG. 9 is a block diagram illustrating a configuration of an electronic device according to still another exemplary embodiment.

FIG. 9 is a block diagram illustrating a configuration of the electronic device 100 according to still another exemplary embodiment. Referring to FIG. 9, the electronic device 100 includes the storage 110, the speaker 120, the processor 130, and a microphone 160. Because the storage 110, the speaker 120, and the processor 130 have been described, the detailed explanation thereof will be omitted.

The microphone 160 may receive an input of a user utterance sound. The microphone 160 may be provided on the electronic device 100, may be separately provided from the electronic device 100, or may be detachably provided on the electronic device 100.

As described above, the electronic device 100 may output a system response that corresponds to a user utterance sound, and may provide a feedback effect to a user simultaneously with outputting of the system response. Further, the electronic device 100 may include a display, and may provide the feedback effect through the display.

The processor 130 may create and output the system response that corresponds to the user utterance sound, and may inform the user that performing of the operation that corresponds to the user utterance sound has been completed through one among an acoustic signal, a message, and a user interface screen. Here, the message or the user interface screen may be output through the display.

For example, if a user utterance sound "Please lower indoor temperature" is received, the processor 130 may search for external devices related to a temperature control function among various external devices arranged in the home, and may transmit control commands for performing functions of lowering the temperature through turn-on of an air conditioner, heightening energy efficiency through closing of a window, and turning off a lamp to the air conditioner, the window, and the lamp, respectively. At the same time, the processor 130 may give a feedback effect to the user by outputting an acoustic signal, such as "Portion that you requested has been processed" or "As you requested, the air conditioner is operated, the window is closed, and the lamp is turned off," through the speaker 120. Further, the processor 130 may give the feedback effect to the user by outputting a message, a user interface screen, or an icon, which includes "Portion that you requested has been processed" or "As you requested, the air conditioner is operated, the window is closed, and the lamp is turned off" in the form of a text, through the display.

Further, the processor 130 may output the system response that corresponds to the user utterance sound, and may additionally recommend or propose another operation or task that has relativity to the output system response to the user.

For example, if a user utterance sound "Show me the movie that I viewed yesterday" is received, the processor 130 may transmit a control command for displaying the movie that was viewed yesterday on the TV to the TV, and may additionally recommend or propose another operation or task, which suits the situation on which the current movie is reproduced in relation to a keyword "movie reproduction" through control commands for reproducing the movie on the TV. The processor 130 may additionally propose or recommend an operation or task related to the control command to reproduce the movie on the TV, such as "Will I lower the illumination level of the lamp?", "Robot cleaner is operating now, and this may disturb the movie viewing. Will I interrupt the operation of the robot cleaner?", or "Will I close the window so as not to disturb the movie viewing?"

As described above, the processor 130 may create and output the system response that corresponds to the user utterance sound, and may inform the user that performing of the operation that corresponds to the user utterance sound has been completed through one among the acoustic signal, message, and user interface screen. Further, the processor 130 may additionally recommend or propose another operation or task that has relativity to the output system response corresponding to the user utterance sound to the user.

Figure 10:
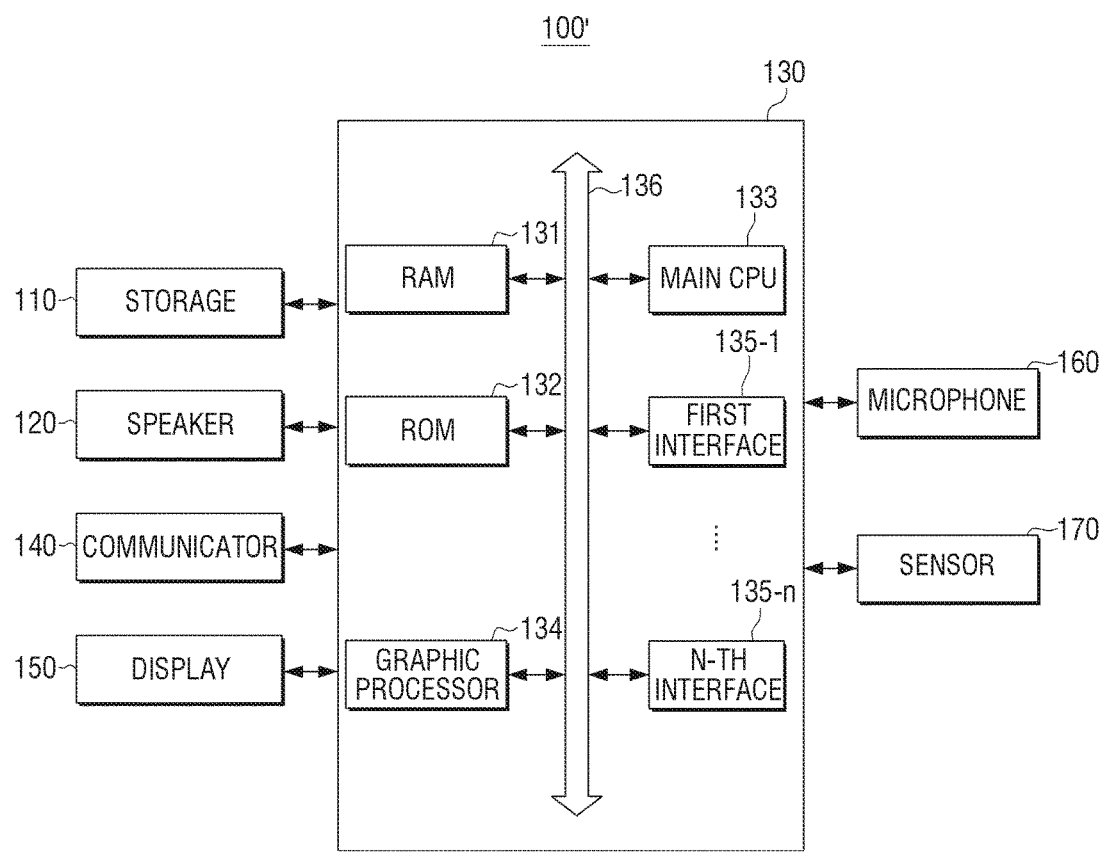
FIG. 10 is a block diagram illustrating a detailed configuration of an electronic device according to yet another exemplary embodiment.

FIG. 10 is a block diagram illustrating a detailed configuration of an electronic device 100' according to yet another exemplary embodiment.

Referring to FIG. 10, the electronic device 100' includes the storage 110, the speaker 120, the processor 130, the communicator 140, the display 150, the microphone 160, and a sensor 170. Detailed description of portions of the configuration illustrated in FIG. 10, which overlap the configuration illustrated in FIGS. 1, 8, and 9, will be omitted.

The processor 130 controls the whole operation of the electronic device 100'.

The processor 130 includes a RAM 131, a ROM 132, a main CPU 133, a graphic processor 134, first to n-th interfaces 135-1 to 135-n, and a bus 136.

The RAM 131, the ROM 132, the main CPU 133, the graphic processor 134, and the first to n-th interfaces 135-1 to 135-n may be connected to one another via the bus 196.

The first to n-th interfaces 135-1 to 135-n are connected to various kinds of constituent elements as described above. One of the interfaces may be a network interface that is connected to an external device through a network.

The main CPU 133 accesses the storage 110 and performs booting using the OS stored in the storage 110. Further, the main CPU 133 performs various kinds of operations using various kinds of programs, content, and data stored in the storage 110.

In the ROM 132, a set of commands for system booting is stored. If a turn-on command is input and a power is supplied, the main CPU 133 copies the OS stored in the storage 140 to the RAM 131 according to the command stored in the ROM 132, and executes the OS to boot the system. When the booting is completed, the main CPU 133 copies various kinds of application programs stored in the storage 140 to the RAM 131, and executes the application programs copied to the RAM 131 to perform various kinds of operations.

The graphic processor 134 creates a screen that includes various objects, such as icons, images, and texts, using an operator and a renderer. Here, the operator operates attribute values, such as coordinate values, shapes, sizes, and colors of the objects to be displayed in accordance with the layout of the screen using a received control command. The renderer creates a screen of various layouts including the objects on the basis of the attribute values operated by the operator. The graphic processor 134 may convert the system response that is created to correspond to the user utterance sound into a text form, and may decide fonts, sizes, and colors of the texts. The screen created by the renderer may be displayed through the display 150.

On the other hand, the operation of the processor 130 as described above may be performed by the programs stored in the storage 110.

The storage 140 may store various kinds of data, such as an OS software module for driving the display device 100' and various kinds of multimedia content.

The storage 110 includes software modules that detect the domain that corresponds to the user utterance sound, and create the system response through determination of one among the detected domain and the previous domain to process the user utterance sound on the basis of the confidence between the user utterance sound and the detected domain. This will be described in detail with reference to FIG. 11.

On the other hand, the sensor 170 may include various kinds of sensors that include a touch sensor for recognizing a touch and a motion sensor for sensing user's motion. The sensor 170 may include a sensor that discriminates the user utterance sound and external noise from each other.

Figure 11:
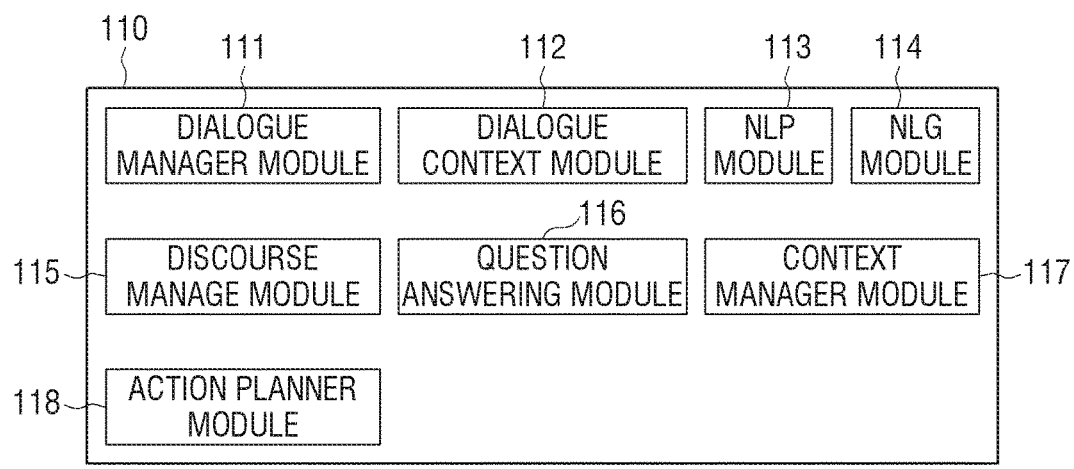
FIG. 11 is a diagram explaining software modules stored in a storage according to an exemplary embodiment.

FIG. 11 is a diagram explaining software modules stored in the storage 110 according to an exemplary embodiment.

Referring to FIG. 11, the storage 110 includes programs, such as a dialogue manager module 111, a dialogue context module 112, an NLP module 113, an NLG module 114, a discourse manage module 115, a question answering module 116, a context manager module 117, and an action planner module 118.

On the other hand, the operation of the processor 130 as described above may be performed by programs stored in the storage 110. Hereinafter, the detailed operation of the processor 130 using the programs stored in the storage 110 will be described in detail.

The dialogue manager module 111 may detect the contents and utterance intention of a user utterance sound through analysis of the user utterance sound, and may perform a function of creating a natural language dialogue with a user. The dialogue manager module 111, which is a main module of a dialogue system, may manage an overall flow of the dialogue that is performed between the user and the electronic device and may manage other internal modules.

The dialogue context module 112 may record and manage the contents of the dialogue between the user and the electronic device 100.

Further, the NLP module 113 may process a natural language, and based on this, detect the user utterance intention.

The NLG module 114 may convert a system response that is created to correspond to the user utterance sound into a text.

Further, the discourse manage module 115 may create the system response on the basis of the contents and the utterance intention of the user utterance sound.

The question answering module 116 may process the contents of a question that is received from the user.

The context manager module 117 may provide information related to the context as monitoring the contents of the dialogue between the user and the electronic device 100, or may detect and provide the context that corresponds to the user utterance sound.

The action planner module 118 may control at least one external device in consideration of the function and performance of the at least one external device on the basis of the contents and the utterance intention of the analyzed user utterance sound.

Here, the results that are output from the action planner module 118 may be determined in various types. For example, in the case in which the user's utterance sound is processed, "The request has been successfully performed" may be output, whereas in the case in which the user's utterance sound is not processed, "The requested contents have been image-performed." Further, if the user utterance sound is processed in a different manner from the user's utterance intention, "The request has been performed in a different manner from the contents requested by the user" may be output.

Further, in the case of additionally processing the related portion in addition to the portion that is requested through the user utterance sound, "The requested portion has been successfully performed. Further, another possible function has been found in relation to the requested portion" may be output.

Further, in the case in which the user's manual operation is used, "User's selection is necessary to process the requested portion" may be output, and in the case in which it is used to request a parameter value, "You are requested to input the parameter value" may be output. Further, in the case in which two or more processing schemes are determined with respect to the user utterance sound, "User's selection is necessary" may be output.

Figure 12:
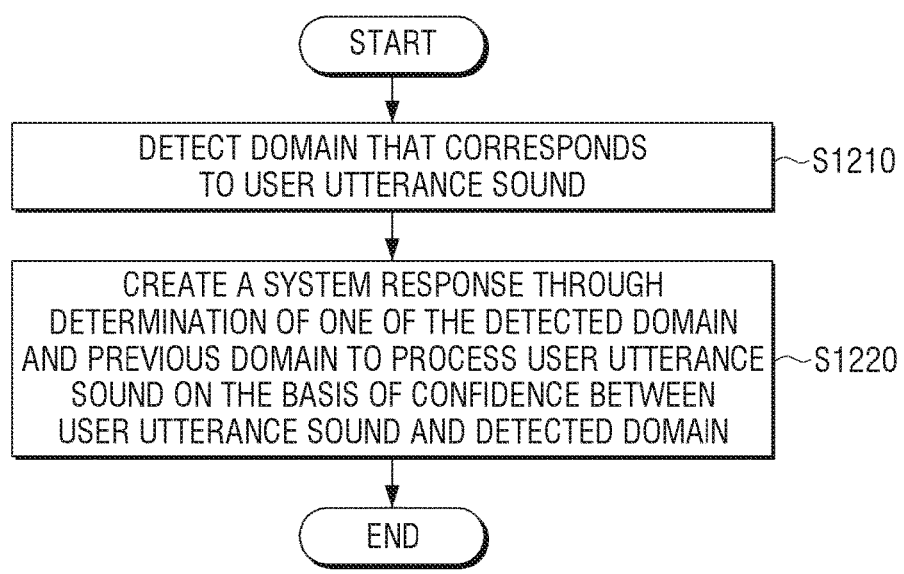
FIG. 12 is a flowchart explaining a method for controlling an electronic device according to an exemplary embodiment.

FIG. 12 is a flowchart explaining a method for controlling an electronic device according to an exemplary embodiment.

According to a method for controlling an electronic device including a storage for storing domain information that is categorized for dialogue subjects as illustrated in FIG. 12, a domain that corresponds to a user utterance sound is detected (S1210).

Then, a system response is created through determination of one of the detected domain and a previous domain to process the user utterance sound on the basis of confidence between the user utterance sound and the detected domain (S1220).

Here, the storage may categorize dialogue subjects that correspond to respective domains for contexts to store the categorized dialogue subjects, and the creating the system response may decide a context that corresponds to the user utterance sound in the case in which the previous domain is determined as the domain to process the user utterance sound, and create the system response through determination of one among the decided context and a previous context to process the user utterance sound on the basis of confidence between the user utterance sound and the decided context.

Further, the creating the system response may store information related to the previous context in the storage in the case in which the decided context is determined as the context to process the user utterance sound, and process new utterance sound on the basis of the stored information related to the previous context in the case in which the utterance sound process on the decided context is ended.

Further, the creating the system response may store information related to the previous domain in the storage in the case in which the detected domain is determined as the domain to process the user utterance sound, and process new utterance sound on the basis of the stored information related to the previous domain in the case in which the utterance sound process on the detected domain is ended.

Further the creating the system response may decide the confidence between the user utterance sound and the detected domain on the basis of a confidence score depending on whether at least one utterance element constituting the user utterance sound coincides with at least one utterance element belonging to the detected domain.

Further, the creating the system response may create the system response for controlling a function of at least one external device on the basis of information on the function of the at least one external device in the case in which the system response that corresponds to the utterance sound is created on the basis of a context that uses a control of the function of the at least one external device in the determined domain.

The method for controlling an electronic device according to an exemplary embodiment may further include receiving function information of the at least one external device that is added in a predetermined network and updating the pre-stored information on the function of the external device.

Further, the method for controlling an electronic device according to an exemplary embodiment may further include creating the system response through determination of the domain to process the user utterance sound on the basis of utterance history information. The utterance history information may include at least one among previously received user utterance sound, information related to the domain that has processed the previously received user utterance sound, and the system response that corresponds to the previously received user utterance sound.

Further, the domain information may include at least one among control information for performing tasks that correspond to the dialogue subjects and dialogue patterns for the dialogue subjects.

Further, the method for controlling an electronic device according to an exemplary embodiment may further include receiving an input of the user utterance sound.

In addition, the exemplary embodiments may also be implemented through computer-readable code and/or instructions on a medium, e.g., a computer-readable medium, to control at least one processing element to implement any above-described embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device for generating an audible system response comprising:
   a storage configured to store domain information that is categorized for dialogue subjects, and control information for performing tasks corresponding to the dialogue subjects and dialogue patterns for the dialogue subjects
   a microphone configured to receive a user utterance sound;
   a speaker configured to output a first audible system response, based on the user utterance sound; and
   a processor configured to:
      detect a current domain, among the domain information, based on the user utterance sound received by the microphone;
      determine one among the current domain and a previous domain as a selected domain to be used to process the user utterance sound received by the microphone, said selected domain being determined based on a first confidence between the user utterance sound and the current domain and a second confidence between the user utterance sound and the previous domain that is used before the current domain to process a previous user utterance sound; and
      process the user utterance sound to generate the first audible system response with the speaker, based on the selected domain, wherein
      in response to the current domain being determined as the selected domain, the processor stores information of the previous domain in the storage as interrupted domain information, and after the user utterance sound is processed based on the current domain as the selected domain, the processor controls the speaker to output a second audible system response responding to the previous user utterance sound based on the stored interrupted domain information.

2. The electronic device of claim 1, wherein the storage is further configured to:
   categorize the dialogue subjects corresponding to respective domains for contexts; and
   store the categorized dialogue subjects, and
   wherein the processor is further configured to:
      select a context, from the contexts, based on the user utterance sound, in response to the previous domain being determined as the selected domain;
      determine one among the selected context and a previous context as a determined context to be used to process the user utterance sound, based on a confidence between the user utterance sound and the selected context; and
      process the user utterance sound to generate the first audible system response, based on the determined context.

3. The electronic device of claim 2, wherein the processor is further configured to:
   store information of the previous context in the storage as interrupted context information in response to the selected context being determined as the determined context; and
   process a new utterance sound, based on the interrupted context information, after the user utterance sound is processed based on the selected context as the determined context.

4. The electronic device of claim 1, wherein the processor is further configured to:
   process a new utterance sound, based on the stored interrupted domain information, after the user utterance sound is processed based on the current domain as the selected domain.

5. The electronic device of claim 1, wherein the processor is further configured to determine the first confidence between the user utterance sound and the current domain, based on whether an utterance element of the user utterance sound coincides with an utterance element of the current domain.

6. The electronic device of claim 1, further comprising a communicator configured to communicate with an external device,
   wherein the processor is further configured to, in response to the processor processing the user utterance sound to generate the first audible system response based on a context using a control of a function of the external device in the selected domain, generate a system response for controlling the function of the external device, based on information of the function of the external device.

7. The electronic device of claim 6, wherein the storage is further configured to store the information of the function of the external device,
wherein the communicator is further configured to receive new information of the function of the external device that is added in a network, and
wherein the processor is further configured to update the stored information, based on the received new information.

8. The electronic device of claim 1, wherein the processor is further configured to determine one among the current domain and the previous domain as the selected domain to be used to process the user utterance sound, based on utterance history information, and
the utterance history information comprises at least one among a previously received user utterance sound, information of a domain that was used to process the previously received user utterance sound, and a system response that was generated based on the previously received user utterance sound.

9. The electronic device of claim 1, wherein the domain information comprises at least one among the control information for performing the tasks corresponding to the dialogue subjects and the dialogue patterns for the dialogue subjects.

10. The electronic device of claim 1, wherein the processor is further configured to:
determine only the first confidence between the user utterance sound and the current domain and the second confidence between the user utterance sound and the previous domain that is used immediately before the current domain to process the previous user utterance sound immediately before the user utterance sound; and
control the speaker to output a message inquiring whether the current domain or the previous domain is the selected domain to be used to process the user utterance sound, in response to the determined first confidence being equal to the determined second confidence.

11. A method of controlling an electronic device for generating a system response, including a storage storing domain information that is categorized for dialogue subjects, and control information for performing tasks corresponding to the dialogue subjects and dialogue patterns for the dialogue subjects, the method comprising:
receiving, with a microphone, a user utterance sound;
detecting, with a processor, a current domain, among the domain information, based on the user utterance sound;
determining, with the processor, one among the current domain and a previous domain as a selected domain to be used to process the user utterance sound received by the microphone, said selected domain being determined based on a first confidence between the user utterance sound and the current domain and a second confidence between the user utterance sound and the previous domain that is used before the current domain to process a previous user utterance sound, wherein the processor determines the current domain as the selected domain;
storing, with the processor, information of the previous domain in the storage as interrupted domain information in response to the current domain being determined as the selected domain;
processing, with the processor, the user utterance sound to generate a first system response, based on the selected domain;
outputting, with an external device or a speaker of the electronic device, the first system response; and
outputting, with the speaker of the electronic device, an audible second system response responding to the previous user utterance sound based on the stored interrupted domain information, after the user utterance sound is processed based on the current domain as the selected domain.

12. The method of claim 11, further comprising:
processing a new utterance sound, based on the stored interrupted domain information, after the user utterance sound is processed based on the current domain as the selected domain.

13. The method of claim 11, further comprising determining the first confidence between the user utterance sound and the current domain, based on whether an utterance element of the user utterance sound coincides with an utterance element of the current domain.

14. The method of claim 11, further comprising, in response to the processing the user utterance sound to generate the first system response based on a context using a control of a function of the external device in the selected domain, generating a system response for controlling the function of the external device, based on information of the function of the external device.

15. The method of claim 14, further comprising:
receiving new information of the function of the external device that is added in a network; and
updating the information of the function of the external device, based on the received new information.

16. The method of claim 11, further comprising determining one among the current domain and the previous domain as the selected domain to be used to process the user utterance sound, based on utterance history information,
wherein the utterance history information comprises at least one among a previously received user utterance sound, information of a domain that was used to process the previously received user utterance sound, and a system response that was generated based on the previously received user utterance sound.

17. The method of claim 11, wherein the domain information comprises at least one among the control information for performing the tasks corresponding to the dialogue subjects and the dialogue patterns for the dialogue subjects.

18. A non-transitory computer-readable storage medium storing a program to cause a computer to perform the method of claim 11.

* * * * *